Dec. 3, 1957     H. ERDMANN     2,814,858
APPARATUS FOR ASSEMBLING OPEN-ENDED RETAINING
RINGS ON GROOVED SHAFTS, PINS AND THE LIKE
Filed June 17, 1955     3 Sheets-Sheet 1

INVENTOR
HANS ERDMANN
BY J. Harold Kilcoyne
ATTORNEY

Dec. 3, 1957 H. ERDMANN 2,814,858
APPARATUS FOR ASSEMBLING OPEN-ENDED RETAINING
RINGS ON GROOVED SHAFTS, PINS AND THE LIKE
Filed June 17, 1955 3 Sheets-Sheet 2

INVENTOR
HANS ERDMANN
BY
ATTORNEY

Dec. 3, 1957  H. ERDMANN  2,814,858
APPARATUS FOR ASSEMBLING OPEN-ENDED RETAINING
RINGS ON GROOVED SHAFTS, PINS AND THE LIKE
Filed June 17, 1955  3 Sheets-Sheet 3
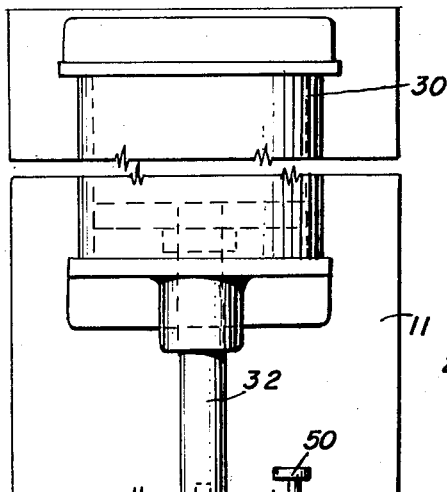
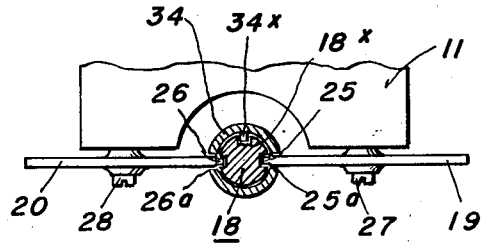
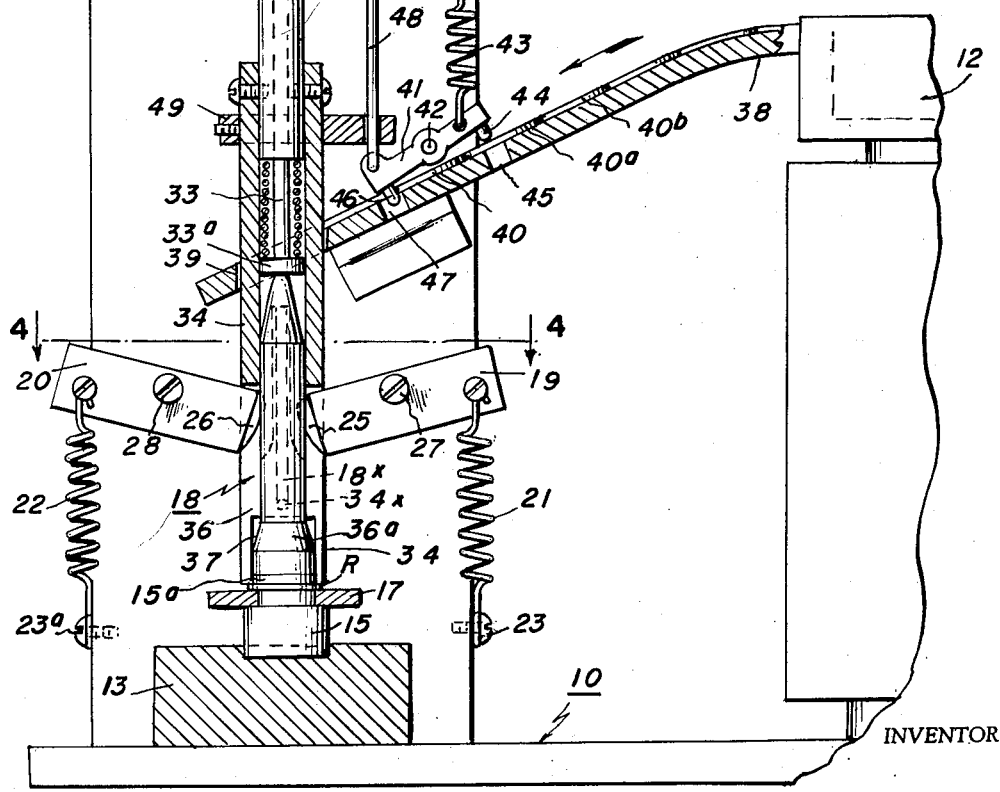
INVENTOR
HANS ERDMANN
ATTORNEY United States Patent Office 2,814,858
Patented Dec. 3, 1957

2,814,858

APPARATUS FOR ASSEMBLING OPEN-ENDED RETAINING RINGS ON GROOVED SHAFTS, PINS AND THE LIKE

Hans Erdmann, Maplewood, N. J., assignor to Waldes Kohinoor, Inc., Long Island City, N. Y., a corporation of New York Application June 17, 1955, Serial No. 516,073

4 Claims. (Cl. 29—229)

This invention relates to improvements in apparatus for assembling open-ended retaining rings on grooved shafts, pins and the like, and more particularly to an improved apparatus for spreading such rings over the ends of shafts and pushing them along said shafts to the plane of the grooves provided for their reception, in fully automatic manner.

As is well known, external open-ended or split retaining rings, of the type adapted when sprung into a groove provided for their reception in a shaft or like carrying member to form an artificial shoulder thereon, are assembled by manually spreading them a controlled amount over the end of the shaft and shifting them therealong to the plane of the groove whereupon they are released, by means of a plier-type hand tool. Such represents a slow and cumbersome operation and hence is not well adapted to the assembly of such rings on their shafts on a mass scale and at the fast rate required in present-day production-line techniques.

Stated broadly, a main object of the invention is the provision of apparatus for assembling split or open-ended retaining rings on grooved shafts which, in addition to mechanizing the assembly operation and thereby doing away with the cumbersome manual assembly operation as heretofore practiced, satisfies the requirements for high-speed assembly.

Another important object of the invention is the provision of fully automatic apparatus for assembling split retaining rings on grooved shafts at an extremely fast rate as compared to the prior manual assembly operation, as is made possible, at least in part, by there being no requirement to orient the retaining rings either prior to or during the assembly operation.

More particularly, an object of the invention is the provision of apparatus for assembling open-ended retaining rings on grooved shafts, of the type in which the rings are fed in succession to a mandrel having a frusto-conical portion which effects spreading of the ring moving axially therealong to a diameter slightly greater than that of the end of the shaft upon which the ring is to be assembled, and which is characterized by an exceedingly fast operation as results in part from the fact that the operation of the apparatus does not require the retaining rings being assembled to be oriented either prior to their being fed to the mandrel, or as they move along said mandrel to the shafts on which they are to be assembled.

Yet another object of the invention is the provision of apparatus for assembling open-ended retaining rings on their shafts as last stated, characterized by a floating mandrel, i. e. a mandrel suspended in the air above the shaft end, and which is thus devoid of the mandrel support whose presence would require the ring to be oriented in moving from mandrel to shaft during the assembly operation.

A more specific object of the invention is the provision of apparatus for assembling open-ended retaining rings on grooved shafts which is characterized by simple design and inexpensive manufacture, and which is thoroughly dependable and effective in its operation.

The above and other objects and advantages of apparatus for assembling open-ended retaining rings on grooved shafts according to the invention will appear from the following detailed description, in which reference is made to the accompanying drawings illustrating a preferred form of such apparatus, and in which Fig. 1 is a front elevation (partly in section) of apparatus according to the invention, the parts being shown in their position at the start of a ring applying operation;

Fig. 3 is a similar view showing the positioning of the parts at the completion of the ring-assembly operation and just prior to return movement of said parts to their initial or starting position; and Fig. 4 is a section taken along line 4—4 of Fig. 3.

Figure 1:
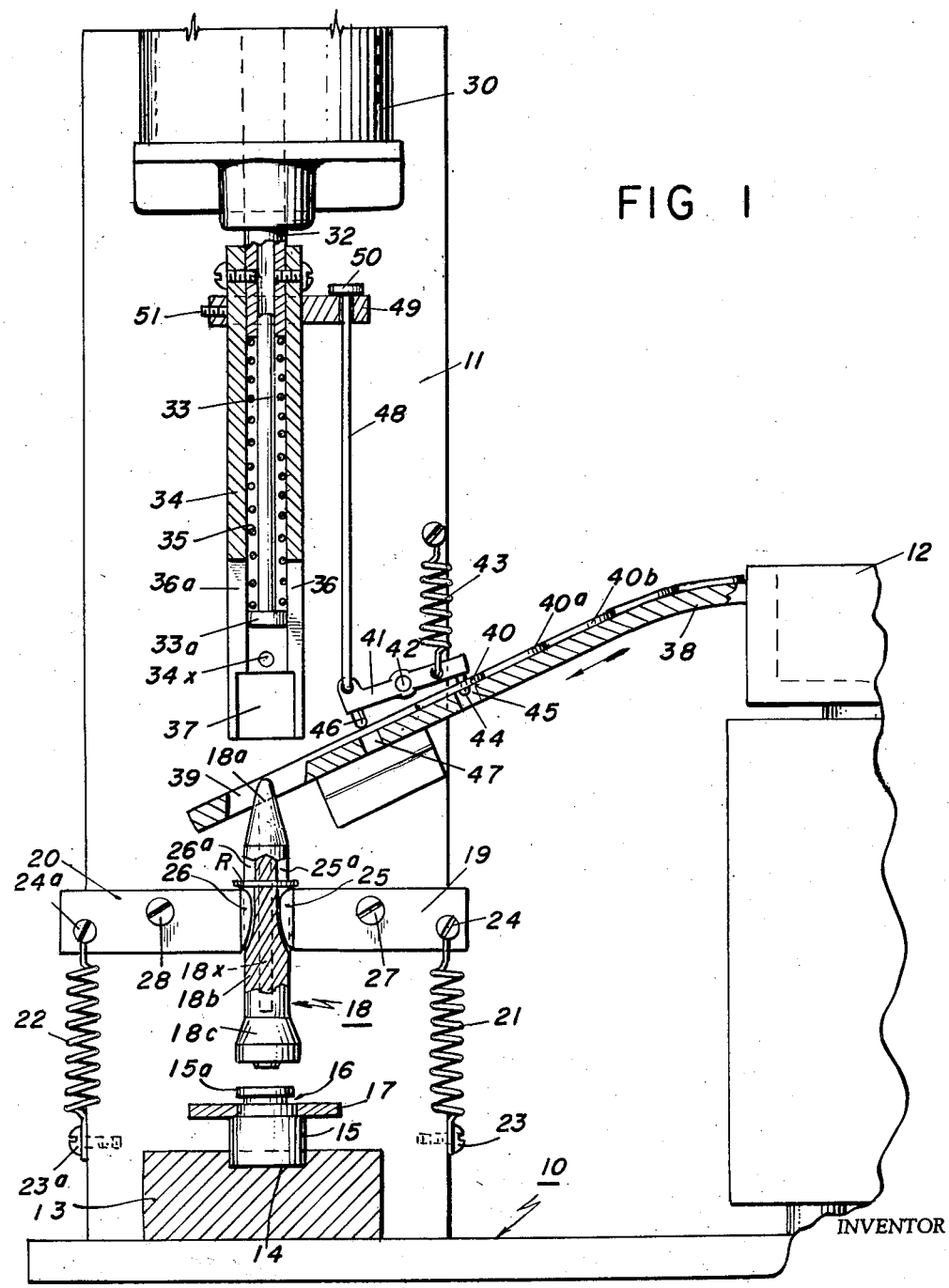

Referring to the drawings, reference numeral 10 designates a horizontal base to which is affixed an upright standard 11 and a ring hopper 12 to which vibratory motion is imparted by means well known in the art. The base 10 is shown to mount or include a raised block-like portion 13 which is provided in its upper surface with a bore or socket 14 serving as a seat for a grooved shaft or similar carrying member 15, in whose groove 16 an open-ended or split retaining ring is to be assembled so as to provide an artificial shaft shoulder for securing a machine part such as a plate 17 mounted on the shaft against movement in one axial direction. It will be understood that the aforesaid means for mounting the shaft 15 on the base 10 with its grooved end disposed upwardly is illustrative only of various other means serving the same function which might be employed.

According to the invention, a stud-like mandrel 18 is normally suspended above and in spaced vertical alignment with the shaft 15. As shown, the mandrel has a pointed upper end 18a for receiving (spearing) the retaining rings to be assembled dropping thereonto from above, a cylindrical body portion 18b having diameter slightly under that of the internal diameter of said rings, and a frusto-conical lower end portion 18c whose larger-diameter end is disposed downwardly or toward the shaft 15 and whose larger diameter corresponds to the diameter of the shaft end 15a over which the ring must be spread to enable it to be shifted to the plane of the shaft groove 16.

Illustratively, the aforesaid means for normally suspending or floating the mandrel 18 in air above the shaft 15 comprises a pair of oppositely disposed swingable jaws 19, 20 together functioning as a chuck. Preferably, the jaws are maintained in their horizontal or mandrel holding position illustrated by means of coil springs 21, 22 whose lower ends are affixed to the standard 11 as by screws 23, 23a and whose upper ends are secured to the outer ends of the jaws 19, 20 as by screws 24, 24a. The inner ends of said jaws are rounded and are moreover reduced in thickness so that they have the form of gripping blades 25, 26 which are appropriately spaced from one another in horizontal direction an amount such that they normally enter diametrically opposed, longitudinal grooves 25a, 26a (Fig. 4) cut or otherwise formed in the peripheral surface of the mandrel 18, so as to extend from about the mid portion of the mandrel axially upward through the pointed upper end. The jaws 19, 20 are adapted to swing downwardly about the axes of their mounting pivots 27, 28 in response to force applied to their inner ends and, when such occurs, the mandrel 18 is of course released from said jaws and hence free to lower onto the shaft 15.

Affixed to the upper end of the standard 11 is an air cylinder 30 whose piston powers a piston rod designated 32. Preferably, said piston rod is formed hollow so as to telescopically receive an inner plunger 33, and it also connects to an outer or sleeve-form plunger 34 whose bore has slightly greater diameter than that of the body portion 18b of the mandrel. Also, said sleeve-form plunger 34 has greater axial length than the internal plunger 33, whereby it houses the large diameter head 33a formed at the lower end of said internal plunger. A spring 35 reactive between said head 33a and the end of the piston rod 32 normally maintains internal plunger 33 in its position of greatest extension with respect to said piston rod. However, the spring 35 enables said internal plunger to retract into the piston rod 32, for example, when its enlarged head 33a engages on the upper or tip end of the mandrel 18 responsively to the plunger as a whole moving downwardly over said mandrel.

The lower end of the sleeve-form plunger 34 is diametrically slotted as at 36, 36a, the slots having width as to comfortably receive the chuck jaws 19, 20. Also, its lower end is provided with a counter-bore 37 of diameter slightly greater than that of the larger diameter lower end of the mandrel 18 and of the end 15a of the shaft 15 as well. Said counter-bore 37 thus provides for the accommodation therein of both the larger-diameter lower end of the mandrel 18 and of the shaft end 15a, upon the sleeve-form plunger moving downwardly to the lowermost limit of its stroke (see Fig. 3).

To secure the mandrel 18 against unwanted rotation as could result in the mandrel grooves 25a, 26a becoming disaligned with the chuck jaw inner ends or blades 25, 26, the sleeve-form plunger 34 is provided in its bore with an inwardly projecting pin 34X (Fig. 4) which is adapted to travel in mandrel slot 18X, upon said plunger lowering onto the mandrel. By positioning the pin 34X near the lower end of the plunger, it begins to exercise its mandrel-securing function before the chuck jaw ends 25, 26 fully retract from the aforesaid mandrel grooves 25a, 26a. Thus, the mandrel is at all times restrained from unwanted angular movement.

The retaining rings to be assembled are fed from the aforesaid hopper 12 onto a chute 38 extending at an inclination from said hopper to a point over the mandrel 18 where the chute is provided with an opening 39 of diameter greater than the outer diameter of the sleeve-form plunger 34, thus to permit movement of said plunger through the chute 38. The inclination of the chute 38 is such that the rings feeding to the upper end thereof tend to positively slide downwardly therealong by gravity and to drop onto the mandrel 18, when free to partake of this movement. To provide for only one ring at a time dropping to the mandrel, ring stop-and-feed means are provided, such illustratively comprising a lever 41 disposed above the chute 38 and being pivoted to the upright 11 intermediate its ends by a pin or pivot 42 for limited rocking movement. A spring 43 operative between one end of the lever and the upright normally biases said lever in counter-clockwise direction to a position in which a stop pin 44 depending from the upper or corresponding end of the lever is lifted from an opening 45 provided therefor in the chute, in which position of the lever a depending pin 46 on its other end is lowered into a second opening 47 provided therefor in the chute, as shown. To provide for rocking movement of the lever 41 against the bias of the aforesaid spring 43, a rod 48 is connected to the end of the lever opposite that to which the spring connects, said rod extending upwardly through a collar 49 affixed as by a set screw 51 to the upper end of the sleeve-form plunger 34 and terminating in an abutment head 50. The collar 49 is so located axially with respect to the rod that, when the sleeve form plunger 34 is in full raised position, it exerts upward pull on the rod 46 as effects a clockwise movement of the lever 41 sufficient to raise the pin 46 from its opening 47 and to lower the pin 44 in its opening 45. Such latter results in the lowermost ring 40 of a series thereof designated 40, 40a, 40b, shown to be positioned on the chute, being held by the pin 44 against further movement down the chute and, consequent to the pin 46 having raised, it also results in a ring previously held by said pin (as in Figs. 2 and 3) dropping through the chute opening 49 onto the mandrel 18. Upon the collar 49 moving away from the rod head 50 consequent to the sleeve-form plunger 34 beginning its downward stroke, lever 41 is rocked counterclockwise by the spring 43, such raising pin 44 and lowering the pin 46 into its opening 47, whereupon the rings 40, 40a, 40b are free to slide down the chute until the ring 40 engages the now lowered pin 46, by which its further downward movement is arrested and it is held until the plunger 34 returns to its raised or starting position. Thus it will be seen that the retaining rings to be assembled can drop only one at a time on to the mandrel 18 and that such is timed to occur upon said plunger completing its upward stroke.

The operation of the above described apparatus is as follows: With the parts in the positon shown in Fig. 1, and assuming that a ring to be assembled (designated R) has dropped through opening 39 of the chute 38 to the mandrel 18 consequent to the preceding upstroke of the plunger 32, and is resting on the upper edges of the chuck jaws 19, 20, lowering movement of said plunger is initiated by supplying air to the upper end of the cylinder 30. Such results in downward movement of both the internal plunger 33 and the external or sleeve-form plunger in unison until the head 33a of the internal plunger engages against the upper or tip end of the mandrel 18. When such occurs, the internal plunger tends to retract into the bore of the hollow piston rod 32 and positively does so upon the mandrel 18 lowering against the shaft 15, as indicated in Fig. 2, thereby to hold the mandrel steady by compressing it axially downward against said shaft. As the outer or sleeve-form plunger 34 lowers, it moves or telescopes over the mandrel until it engages the ring R and, through said ring, imparts downward force on the inner or gripping ends of the chuck jaws 19, as results in said jaws swinging downwardly to a position as generally shown in Fig. 2. In such position the chuck frees the mandrel, which proceeds to lower against the shaft 15, being guided meanwhile by the pin 34X, with the result that the parts now assume the position shown in Fig. 2. As the sleeve-form plunger 34 continues its downward stroke, it pushes the ring R downwardly over the frusto-conical portion 18c of the mandrel (thereby spreading it) and thence on to and over the shaft end 15a to the plane of the groove 16, whereupon the ring snaps into said groove, all as intended to be indicated in Fig. 3. During the final lowering movement of the sleeve-form plunger 34, the frusto-conical portion of the mandrel and the end portion 15a of the shaft are accommodated in the counter-bore 37 of said plunger, and also the inner ends of the chuck jaws 19, 20 are accommodated in the diametrical slots 36, 36a provided in the lower end of said plunger. When so positioned, the jaws are conditioned to again grip the mandrel 18, which they proceed to do upon the sleeve-form plunger 34 beginning its return stroke, thereby to lift the mandrel 18 from the shaft 15. Since the ring R has now been applied to said shaft, the latter may be lifted from the socket or seat 14 and another shaft on which a ring is to be assembled inserted therein.

Figure 2:
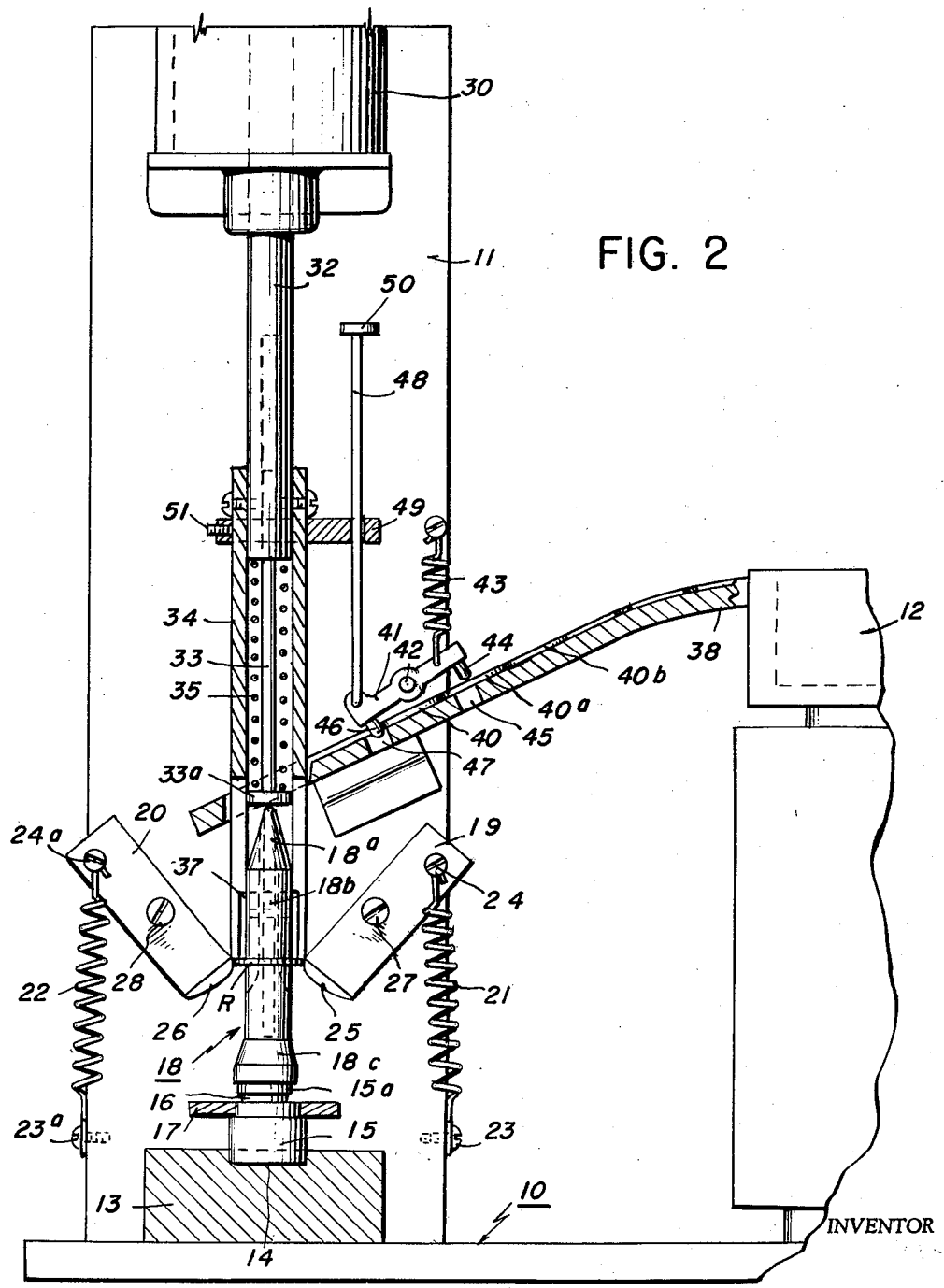
Fig. 2 is a similar view but illustrating the position of the parts at an early stage of the assembly operation.

Consequent to the sleeve-form plunger 34 moving throughout and completing its return stroke, pin 46 is raised and pin 44 lowered, with the result that the ring which was held by the pin 46 is released and proceeds to move through the chute opening 39 and to drop on to the mandrel and thence to the position corresponding to that of the aforesaid ring R (Fig. 1). The apparatus is now ready for a repeat operation, which is initiated by admitting air to the upper end of the cylinder 30.

From the above, it will be seen that the herein illustrated and described apparatus for assembling open-ended or split retaining rings on grooved shafts according to the invention meets the objectives therefor as outlined above. However, as many changes could be made in carrying out the above constructions without departing from the scope of the invention, it is intended that all matter contained in the above description or shown in the accompanying drawings shall be interpreted as illustrative and not in a limiting sense.

I claim:

1. Apparatus for assembling open-ended spring retaining rings on grooves shafts and the like comprising, in combination, means for supporting a grooved shaft in upright position with its grooved end disposed upwardly, a mandrel for a retaining ring to be assembled on said shaft by feeding to it from above, said mandrel having a cylindrical body portion of diameter corresponding substantially to the internal diameter of the ring in its unstressed state and a frusto-conical lower portion whose larger-diameter end is disposed toward said shaft, the diameter of the larger diameter end substantially equaling that of the shaft, releasable means normally holding said mandrel raised above and in axial alignment with the shaft and being operative also to return the mandrel to its normal raised position following lowering thereof, and a reciprocatory sleeve-form plunger adapted on its working stroke to lower over said mandrel and being operative responsively to such lowering movement to render said releasable means inactive and thereby to effect lowering of the mandrel on to the shaft, and thereupon to force the retaining ring received on said mandrel along the length thereof and thence over the shaft end to the groove, said releasable mandrel holding means comprising a pair of opposed arms mounted for swinging movement toward and away from a normal position in which their adjacent ends have gripping engagement with diametrically opposed sides of the mandrel and spring means normally biasing said arms to their normal position aforesaid, the adjacent ends of said arms being positioned in the path of plunger travel whereby said arms are swung downwardly from their normal position by said plunger responsively to lowering thereof, said spring means being effective to swing the adjacent ends of said arms upwardly into gripping engagement with the mandrel responsively to the plunger moving upwardly on its return stroke, thereby to effect return of the mandrel to its normal raised position.

2. Apparatus for assembling open-ended retaining rings on grooved shafts and the like as set forth in claim 1, wherein said plunger and said mandrel are provided with complemental means for preventing the mandrel from turning during the interval that the gripping arms are out of gripping engagement with the mandrel.

3. Apparatus for assembling open-ended retaining rings on grooved shafts and the like as set forth in claim 1, combined with an inclined ring chute operatively related to the mandrel and means for causing a retaining ring to be assembled being disposed on the chute to drop through an opening in the chute on to the mandrel responsively to the completion of each ring-assembly operation.

4. Apparatus for assembling open-ended retaining rings on grooved shafts and the like as set forth in claim 3, wherein said chute extends between a ring hopper and the mandrel and is adapted to accommodate a series of rings to be assembled a pair of ring stop and release pins mounted on a rocking lever and being disposed in the path of movement of said rings, and means for rocking said lever in timed relation to the movement of the plunger and in such manner as to release the lowermost ring of the series for movement down the chute to the mandrel responsively to the plunger completing a ring-assembly cycle and simultaneously therewith to interrupt movement of the remaining rings of the series down the chute.

References Cited in the file of this patent

UNITED STATES PATENTS

| | | |
|---|---|---|
| 979,438 | Courtney | Dec. 27, 1910 |
| 1,110,690 | Hurt | Sept. 15, 1914 |
| 1,793,285 | Hambleton et al. | Feb. 17, 1931 |